(12) United States Patent
McMillan (10) Patent No.: US 11,477,976 B2
(45) Date of Patent: Oct. 25, 2022

(54) STREET LIGHT MOSQUITO ZAPPER

(71) Applicant: George Erik McMillan, Hickory, NC (US)

(72) Inventor: George Erik McMillan, Hickory, NC (US)

(73) Assignee: Epic Universal Technologies, LLC, Hickory, NC (US)

( * ) Notice: Subject to any disclaimer, the term of this patent is extended or adjusted under 35 U.S.C. 154(b) by 156 days.

(21) Appl. No.: 16/915,625

(22) Filed: Jun. 29, 2020

(65) Prior Publication Data

US 2020/0404898 A1    Dec. 31, 2020

Related U.S. Application Data

(60) Provisional application No. 62/868,555, filed on Jun. 28, 2019.

(51) Int. Cl.
| | |
|---|---|
| *A01M 1/22* | (2006.01) |
| *A01M 1/04* | (2006.01) |
| *F21V 23/04* | (2006.01) |
| *F21V 23/06* | (2006.01) |
| *F21S 8/08* | (2006.01) |
| *F21V 7/00* | (2006.01) |
| *F21W 131/103* | (2006.01) |
| *F21Y 115/10* | (2016.01) |
| *F21Y 113/10* | (2016.01) |

(52) U.S. Cl.
CPC .............. *A01M 1/223* (2013.01); *A01M 1/04* (2013.01); *F21S 8/086* (2013.01); *F21V 7/00* (2013.01); *F21V 23/0435* (2013.01); *F21V 23/0464* (2013.01); *F21V 23/06* (2013.01); *F21W 2131/103* (2013.01); *F21Y 2113/10* (2016.08); *F21Y 2115/10* (2016.08)

(58) Field of Classification Search
CPC .......... A01M 1/223; A01M 1/22; A01M 1/08; A01M 1/02; A01M 1/24; A01M 1/04; F21W 2131/103; F21Y 2115/10; F21Y 2113/10; F21V 23/06; F21V 23/0464; F21V 23/0435; F21V 7/00; F21S 8/086
See application file for complete search history.

(56) References Cited

U.S. PATENT DOCUMENTS

| | | | | |
|---|---|---|---|---|
| 3,319,374 | A * | 10/1966 | Gawne | A01M 1/08 |
| 4,788,789 | A * | 12/1988 | Boobar | A01M 1/04 |
| | | | | 43/113 |
| 2012/0294828 | A1* | 11/2012 | Zhang | A01N 43/20 |
| | | | | 424/84 |
| 2014/0068999 | A1* | 3/2014 | Singleton | A01M 1/22 |
| 2014/0137462 | A1* | 5/2014 | Rocha | A01M 1/02 |
| 2016/0000060 | A1* | 1/2016 | Sandford | A01M 1/14 |
| 2019/0281805 | A1* | 9/2019 | Jaffrey | A01M 1/20 |

* cited by examiner

*Primary Examiner* — Joshua E Rodden
*Assistant Examiner* — Henry Hooper Mudd
(74) *Attorney, Agent, or Firm* — Goodwin Procter LLP (57) ABSTRACT

In one aspect, an exterior lighting insect zapper includes a photosensor configured to sense an amount of light for turning on or off an exterior light and an insect zapper coupled to the photosensor. The exterior lighting insect zapper also includes a twist-lock plug compatible with a receptacle of an exterior light for a photosensor unit plug, such that the exterior lighting insect zapper can replace existing photosensors of exterior light fixtures.

21 Claims, 7 Drawing Sheets

STREET LIGHT MOSQUITO ZAPPER

RELATED APPLICATIONS

This application claims the benefit of U.S. Provisional Patent Application No. 62/868,555 filed on Jun. 28, 2019; which is herein incorporated by reference in entirety.

TECHNICAL FIELD

The present invention generally relates to exterior light fixtures like street lights, and particularly relates to killing mosquitoes that are attracted to exterior lights.

BACKGROUND

Figure 1:
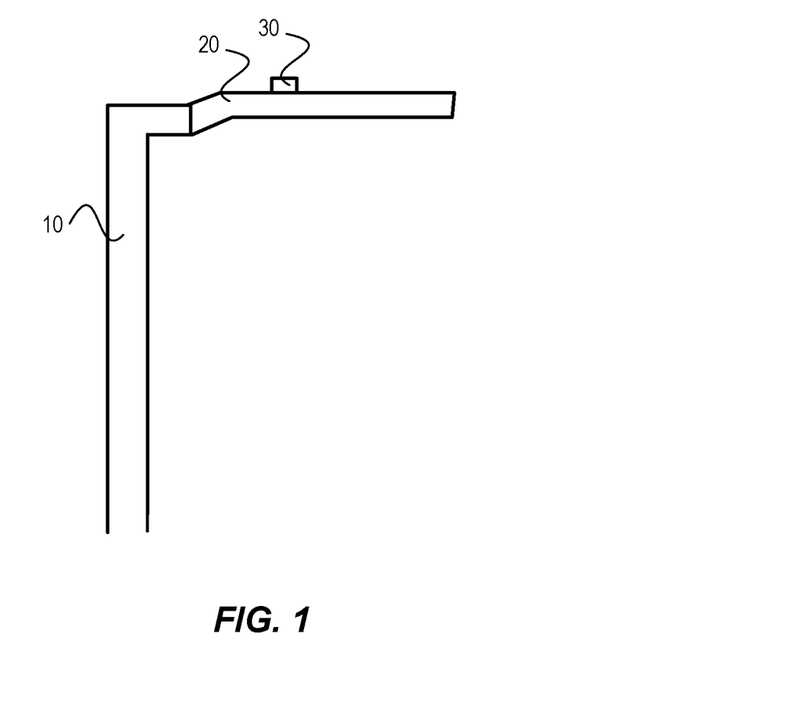
FIG. 1 illustrates a cobra head street light.

FIG. 1 illustrates an exterior light, which in this case is a street light. The street light has an exterior light fixture 20 on a light pole 10. In this case, light fixture 20 is a "cobra head" light. Light fixture 20 includes a removable (twist-lock) photosensor unit 30 that detects the amount of light outside. When it is dark outside, light fixture 20 turns on, as expected. Street lights are beneficial for low light situations, but they attract insects. Some insects are beneficial, and some insects are troublesome or harmful, such as mosquitos, gnats or biting flies.

Current insect zappers are indiscriminate as to what insects they kill. It is not desirable that dragonflies or bees are killed. Furthermore, current methods of insect control involve regularly spraying chemicals around areas where people frequent and that would be lit by exterior lighting fixtures. This is not ideal for human health and the environment. Furthermore, some chemicals become less effective due to the genetic mutations of the mosquitos.

SUMMARY

Embodiments of the present invention include a mosquito zapper that is easily inserted in place of a removable photosensor unit on exterior street lights. By replacing this photosensor unit with a combination photosensor/insect zapper, no extra infrastructure or maintenance is required to control mosquitos or other small biting insects around areas that are lit by exterior lighting fixtures. Mosquito adaptation to chemicals is a non-issue because mosquitoes are killed on contact. This solution is also more environmentally friendly.

According to some embodiments, an exterior lighting insect zapper includes a photosensor configured to sense an amount of light for turning on or off an exterior light fixture. The exterior lighting insect zapper also includes an insect zapper coupled to the photosensor, where the insect zapper includes one or more LEDs configured to emit light of one or more spectrums, and an outer cage configured to let insects no larger than a predetermined size to pass through. The insect zapper also includes a pair of leads spaced apart by a gap with a certain voltage, to provide a current arc across the gap when an insect enters the gap, killing the insect. The exterior lighting insect zapper further includes a twist-lock plug compatible with a receptacle in an exterior light fixture meant for a photosensor unit plug.

In at least one embodiment, the insect zapper assembly includes a pair of leads having a gap therebetween, a first screen and a second screen. The first screen is along the outer cage and the second screen is along the innermost lead.

In at least one embodiment, the insect zapper includes twist-lock plug compatible with a receptacle on an exterior light fixture for a photosensor unit plug.

In at least one embodiment, the insect zapper includes a light reflector configured to reflect light emitted from the one or more LEDs. light reflector comprises a column portion and a bottom portion that is sloped downward. A liquid sensor may be provided that is located on the bottom portion of the light reflector. The liquid sensor is configured to turn-off at least a portion of power to the insect zapper assembly when liquid is detected.

In at least one embodiment, the one or more LEDs are configured to emit light having a wavelength in the range of 450-570 nanometers.

In at least one embodiment, the one or more LEDs comprise at least two LEDS, wherein at least one LED is configured to emit light having a wavelength in the range of 450-495 nanometers and at least one LED is configured to emit light having a wavelength in the range of 495-570 nanometers.

In at least one embodiment, the photosensor is configured to turn on or off a portion of power to the insect zapper assembly.

In at least one embodiment, the insect zapper has a control panel that is configured to enable a user to set one or more operating conditions of the insect zapper. Examples of operating conditions are to operate the insect zapper for 24 hours or to operate the insect zapper only when the photosensor detects a low level of light.

In at least one embodiment, the light reflector is comprised of a primary material and reflective coating. In at least one embodiment, the light reflector is coated with a low-friction coating configured to allow debris to easily rinse off.

In at least one embodiment, an insect zapper assembly includes one or more light-emitting diodes (LEDs) configured to emit light of one or more spectrums, wherein the one or more spectrums of light are configured to be attractive to a desired insect. The insect zapper also has an outer cage configured to let insects no larger than a predetermined size to pass through and a pair of leads spaced apart by a gap. The leads are configured with a voltage to provide a current arc across the gap when an insect enters the gap, killing the insect. The insect zapper assembly is connected to a photosensor configured to sense an amount of light and for turning on or off power to an exterior light assembly.

In at least one embodiment, the insect zapper assembly includes a temperature sensor configured to shut off a portion of power to the insect zapper assembly when an outside temperature is below a predetermined temperature.

In at least one embodiment, a light reflector configured to reflect light emitted from the one or more LEDs, wherein the light reflector comprises a column portion and a sloped bottom portion.

In at least one embodiment, an insect zapper assembly includes one or more LEDs, an outer cage, a pair of leads spaced apart by a gap, a liquid sensor and a photosensor assembly. The one or more LEDs are configured to emit light of one or more spectrums, wherein each of the one or more spectrums of light are configured to be attractive to a desired insect. The outer cage is configured to let insects no larger than a predetermined size to pass through. The leads are configured with a voltage to provide a current arc across the gap when an insect enters the gap, killing the insect. The liquid sensor assembly is configured to turn a portion of power off to the insect zapper assembly. The photosensor assembly is configured to sense an amount of light and for turning on or off a portion of power to the insect zapper assembly.

In at least one embodiment, the insect zapper system includes a temperature assembly couple to the insect zapper assembly and configured to turn a portion of power off to the insect zapper assembly when an outside temperature is below a predetermined temperature.

In at least one embodiment, the insect zapper system includes a wireless communication module configured to receive and transmit information to a remote computing device, wherein the received and transmitted information can include any of the following: sensed data information, light sensitivity information, temperature information, power consumption information, and powering on or off portions of the insect zapper system instructions.

In at least one embodiment, a method of attracting and eliminating insects is contemplated. The method includes providing a photosensor configured to sense an amount of light and for turning on or off an external light and providing an insect zapper assembly coupled to the photosensor. The insect zapper assembly includes one or more LEDs configured to emit light of one or more spectrums, an outer cage, and a pair of leads. The outer cage is configured to let insects no larger than a predetermined size to pass through. The pair of leads are spaced apart by a gap, wherein the leads are configured with a voltage to provide a current arc across the gap when an insect enters the gap, killing the insect. The method includes adjusting the one or more light-emitting diodes to emit a wavelength that is considered attractive to a desired insect and mounting the insect zapper assembly onto a twist-lock plug compatible with a receptacle on an exterior light fixture for a photosensor unit plug.

In at least one embodiment, a method includes providing a photosensor configured to sense an amount of light and for turning on or off an exterior light and coupling an insect zapper assembly to the photosensor. The insect zapper assembly includes one or more LEDs configured to emit light of one or more spectrums, an outer cage and a pair of leads. The outer cage is configured to let insects no larger than a predetermined size to pass through. The pair of leads spaced apart by a gap, wherein the leads are configured with a voltage to provide a current arc across the gap when an insect enters the gap, killing the insect. The insect zapper assembly is mounted onto a twist-lock plug compatible with a receptacle on an exterior light fixture for a photosensor unit plug, and the insect zapper assembly is activated by turning-on one or more selected LEDs and providing voltage across the pair leads, wherein the LEDs are selected to emit light in a wavelength that attracts a type of insect that is desired to be eliminated.

Of course, the present invention is not limited to the above features and advantages. Those of ordinary skill in the art will recognize additional features and advantages upon reading the following detailed description, and upon viewing the accompanying drawings.

DETAILED DESCRIPTION

Embodiments of the present invention are directed to an insect zapper that is easily inserted in place of a removable photosensor unit on exterior street lights.

Figure 2:
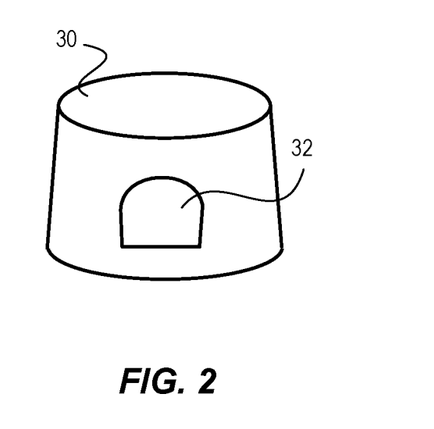
FIG. 2 illustrates a photosensor unit.
Figure 3:
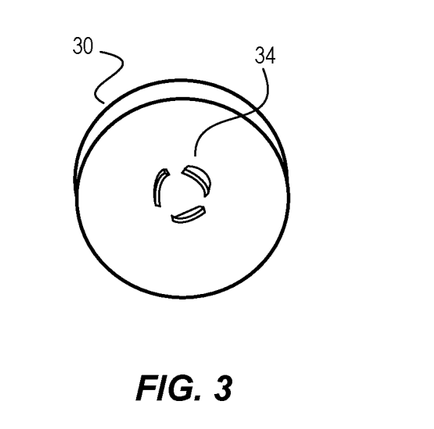
FIG. 3 illustrates the bottom of a photosensor unit.

FIGS. 2 and 3 illustrate a photosensor unit 30 with a three prong, twist-lock plug 34 that removably attaches to light fixture 20 of FIG. 1. Photosensor unit 30 has a light sensor 32 for detecting how light it is outside for the efficient use of light fixture 20. An insect zapper is an electronic device that uses energy to "zap" or kill insects.

Figure 4:
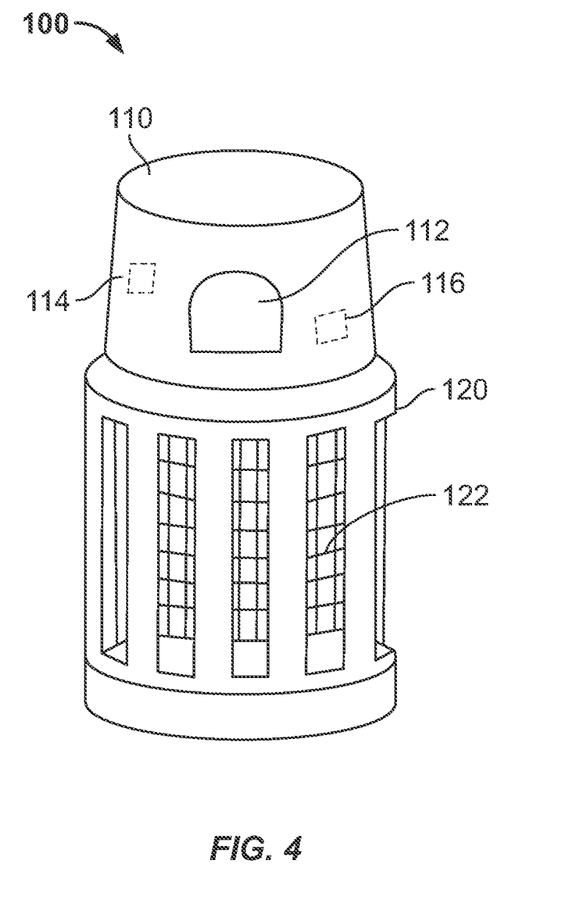
FIG. 4 illustrates an exterior lighting insect zapper, according to some embodiments.

FIG. 4 illustrates an exterior lighting insect zapper 100, according to some embodiments, that is a particular combination of photosensor unit and insect zapper. Exterior lighting insect zapper 100 includes a photosensor 112 configured to sense an amount of light for turning on or off an exterior light, such as light fixture 20. Photosensor 112 may be part of component 110, which may also house the power circuitry for generating the voltage for the insect zapper 100. A temperature sensor 114 is may be provided on exterior portion of the insect zapper. A control panel 116 may be provided on exterior portion of the insect zapper 100. The control panel 116 can be used to set operating conditions of the insect zapper 100. For example, the control panel 116 can be used to set the insect zapper 100 to operate only if the photosensor 112 senses a level of light that is below a predetermined threshold or to operate 24 hours a day. The control panel 116 may be a touch a screen, or one or more switches.

In one embodiment, the control panel 116 is a wireless communication device, such as cellular communication device or a Bluetooth device, and the operator may control functioning of the insect zapper from a mobile device such as a cell phone, tablet, or laptop computer.

The insect zapper of exterior lighting insect zapper 100 is coupled to component 110 and includes one or more light-emitting diodes (LEDs) configured to emit light of one or more spectrums. This may include an ultraviolet spectrum and/or other light spectrums (e.g., blue light) to which mosquitos, gnats or biting flies may be drawn. The insect zapper may have an outer cage or structure 120 with spaces in which insects no larger than a predetermined size can pass through. The predetermined size may be a size that prevents dragonflies and certain other insects from approaching the leads. There may also be a screen mesh along the outer part of this cage 120 with a mesh size that is only big enough for mosquitos, gnats and other small biting flies.

Figure 5:
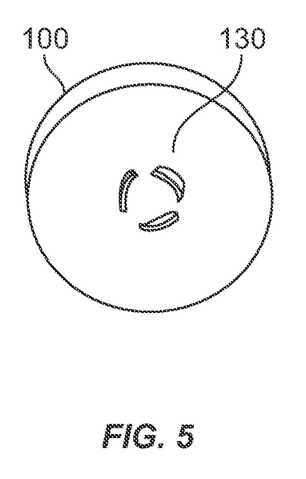
FIG. 5 illustrates a bottom view of the exterior lighting insect zapper, according to some embodiments.

Exterior lighting insect zapper 100 includes a twist-lock plug 130 compatible with a receptacle for a photosensor unit plug. Plug 130 is on the bottom of exterior lighting insect zapper 100, as shown in FIG. 5. This allows for the quick replacement or initial substitution of existing photosensor units 30.

Figure 6:
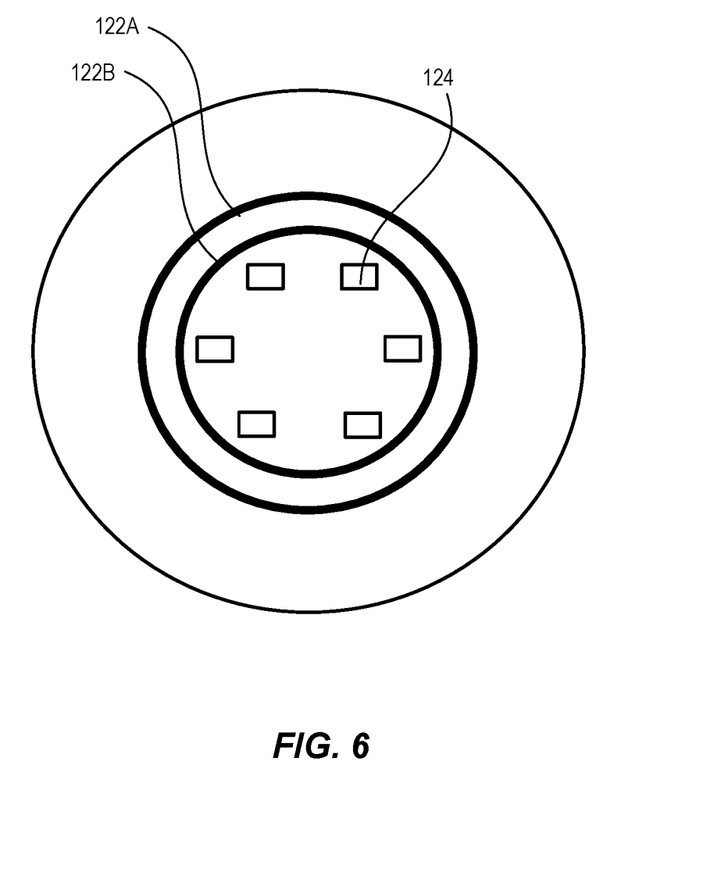
FIG. 6 illustrates a bottom view of the inside of the exterior lighting insect zapper, according to some embodiments.

Exterior lighting insect zapper 100 also includes a pair of leads spaced apart by a gap with a certain voltage, to provide a current arc across the gap when an insect enters the gap, killing the insect. FIG. 4 shows the location of leads 122. FIG. 6 is a bottom up view of the inside of exterior lighting insect zapper 100 that shows how the pair of leads 122 may be inner 122A and outer 122B metallic mesh tubes, where inner mesh tube 122A fits within the circumference of the other mesh tube, creating the gap. FIG. 6 also shows an example of the LEDs 124 that will provide light near leads 122A and 122B. It should be noted that the pair of leads can be arranged in variety of ways including, metallic vertical bars, horizontal bars, grid of bars both horizontal and vertical or a mesh design. The principal being that the arrangements are separated by a gap that the mosquito or other intended insect when bridging the gap causes a current arc, which in turn zaps or kills the mosquito.

There may be a second screen along inner mesh tube 122A, where the mesh size of this second screen is smaller than a mesh size of a first screen along the outside of cage 120. This will help prevent the buildup of dead mosquitos where the rain and wind would have difficulty clearing the dead mosquitos. In some cases, there may be a third screen on or along outer mesh tube 122B, sized for certain insects. The bottom of cage 120 may be sloped downward underneath the leads and there may be openings at the top of cage 120, all serving to help with the natural clearing of dead mosquitos and other dead insects.

Exterior lighting insect zapper 100 may be equipped with a temperature gauge, such that exterior lighting insect zapper 100 is configured to shut off the insect zapper portion when the outside temperature is below a predetermined temperature, such as below 55 degrees Fahrenheit. This is desirable because mosquitos and other biting insects typically do not come out when the temperature is below 55 degrees Fahrenheit. Turning off the insect zapper 100 when the temperature is cold saves electricity and reduces operating costs.

Figure 7A:
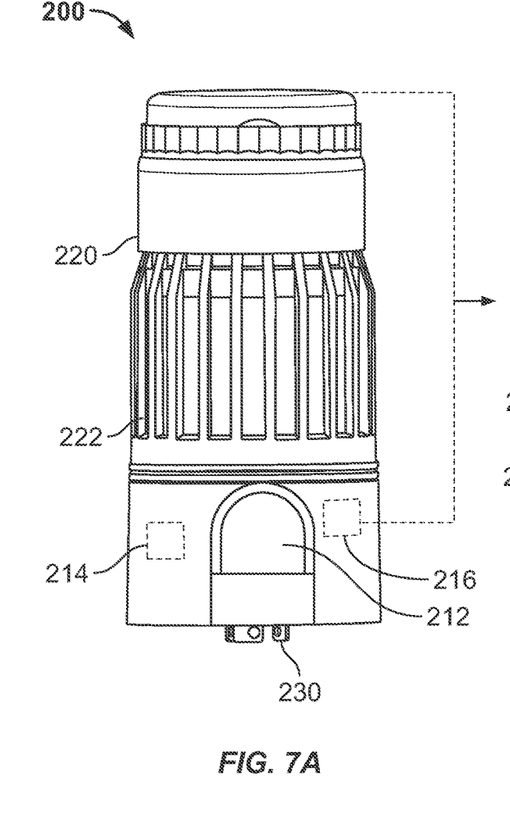
FIG. 7A illustrates another embodiment of an insect zapper.

FIG. 7A illustrates an insect zapper 200 having a photosensor 212 located on bottom portion of the insect zapper 200. The photosensor 212 is configured to sense an amount of light for turning on or off an exterior light, such as light fixture 20. Photosensor 212 may be part of component 110, which may also house the power circuitry for generating the voltage for the insect zapper 200. A temperature sensor 214 may be provided on exterior portion of the insect zapper. A control panel 216 may be provided on exterior portion of the insect zapper 200. The control panel 216 can be used to set operating conditions of the insect zapper 200. For example, the control panel 216 can be used to set the insect zapper 200 to operated only if the photosensor 212 senses a level of light that is below a predetermined threshold or to operate 24 hours a day. The control panel 216 may be a touch a screen, or one or more switches.

The insect zapper 200 is coupled to component 110 and includes one or more light-emitting diodes (LEDs) configured to emit light of one or more spectrums. This may include an ultraviolet spectrum and/or other light spectrums (e.g., blue light) to which mosquitos, gnats or biting flies may be drawn. The insect zapper may have an outer cage or structure 220 with spaces in which insects no larger than a predetermined size can pass through. The predetermined size may be a size that prevents dragonflies and certain other insects from approaching the leads. There may also be a screen mesh along the outer part of this cage 220 with a mesh size that is only big enough for mosquitos, gnats and other small biting flies. The cage 220 surrounds leads 222 and inner leads 236 (shown in FIG. 7B).

The lighting insect zapper 200 includes a twist-lock plug 230 compatible with a receptacle for a photosensor unit plug. Plug 230 is on the bottom of exterior lighting insect zapper 200, as shown in FIG. 5. This allows for the quick replacement or initial substitution of existing photosensor units 30.

Figure 7B:
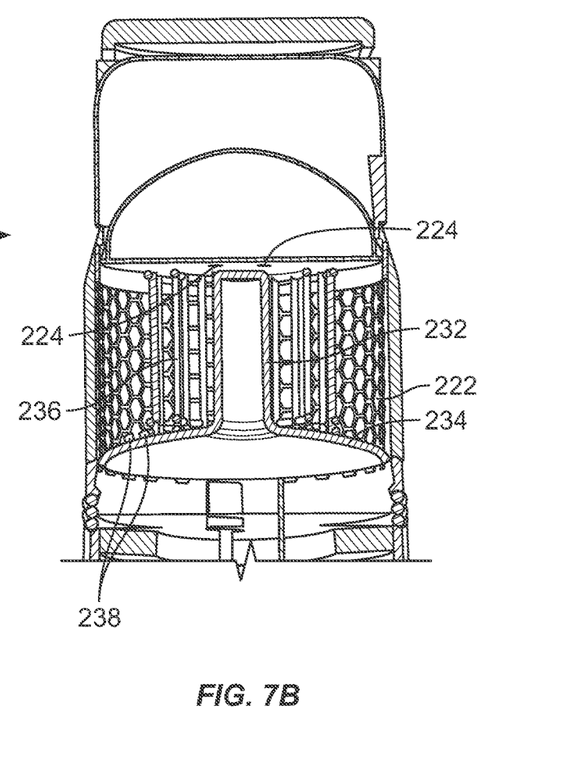
FIG. 7B illustrates a cut-away view of the insect zapper of FIG. 7A.

FIG. 7B illustrates a cross-sectional view of the insect zapper 200 shown in FIG. 7A. One more LEDs 224 are provided which emit light of one or more spectrum. A light reflector 231 has a column like portion 232 and bottom portion 234 that are configured to reflect light emitted from the one or more LEDs 224 outside of the outer cage 220 to attract insects. The bottom portion 234 of the light reflector 231 has a downward slope that helps facilitate rain cleaning the interior of the insect zapper 200. This slope makes it easier for insect remains and other containments to flow out of the interior portion. To help facilitate this the outer cage 220 and the leads 222 may have slight gap above the bottom portion 234 of the light reflector 231.

A water or moisture sensor 238 may be located on the bottom portion 234 of the light reflector 231. The water sensor 238 is configured to detect water on the bottom portion 234 indicating that is raining outside. Typically, mosquitos and other biting insects stay sheltered during rain and do not bite people. Accordingly, the water detector 238 may be utilized to turn off the insect zapper 200 when water is detected on the bottom portion 234. The water sensor may be two conductive members, such as electrodes, that form an open circuit. When water is present, the conductivity of the water completes the circuit and the completed circuit sends a signal indicating that water is present.

Figure 7C:
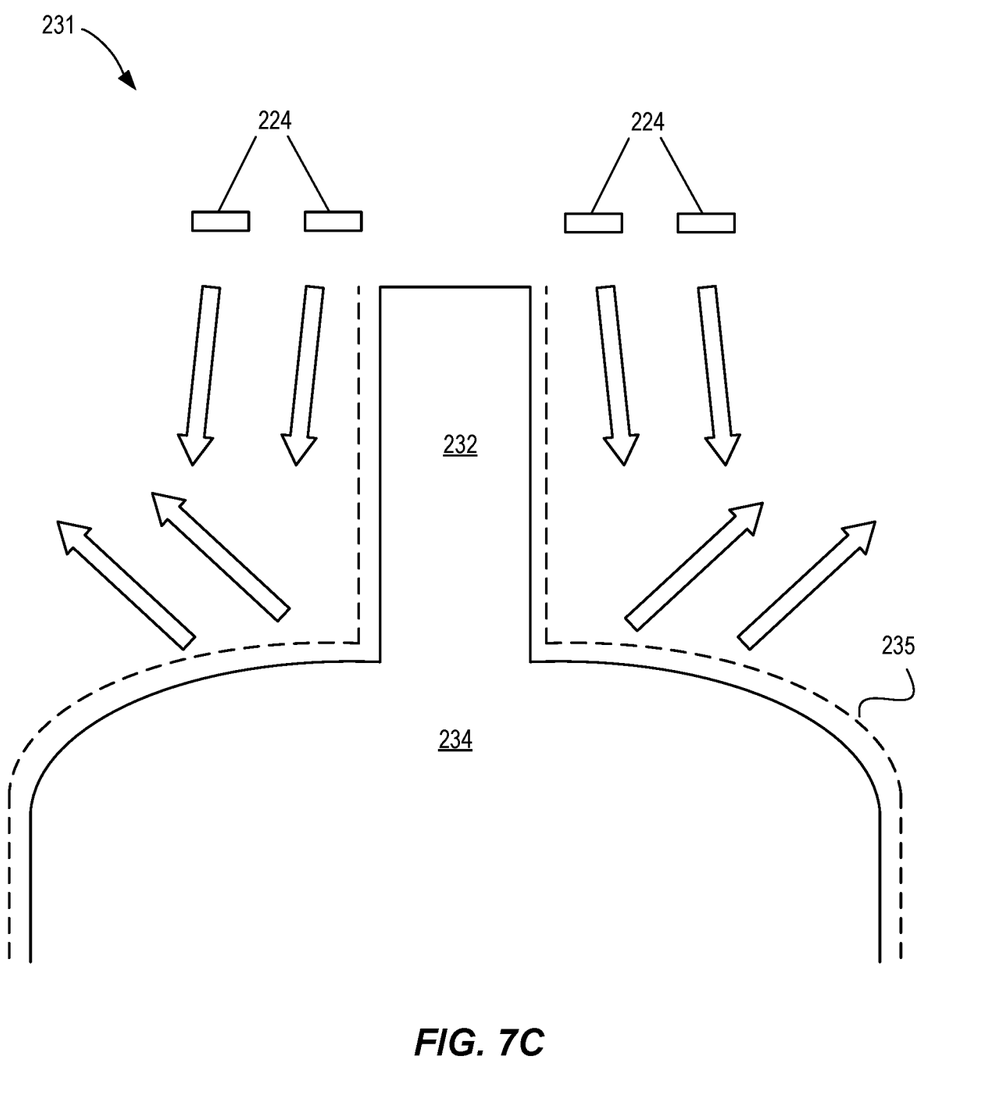
FIG. 7C is a block diagram illustrating light emitted from LEDs being reflected by a reflector.

FIG. 7C is a block diagram illustrating light emitted from the one or more LEDs 224 being reflected by the reflector 231. The one or more LEDs 224 emit light downwards towards the lower portion 234 of the reflector 231 and the lower portion 234 of the reflector 231 reflects the light outward. This is shown by the arrows in FIG. 7C. The column 232 of the reflector 231 is also reflective so any light that contacts the column 232 will also be reflected outwards away from the reflector 231.

In one embodiment, the reflector comprises a material that it is naturally reflective. The material has reflective outer portion that also has a surface that is very smooth with a very low efficient of friction. This smooth surface shaped with a curve (as shown) or slope naturally allows for rain water to quickly drain from the surface of the reflector and to wash any contaminants such as dirt, pollen, or insect carcasses that have collected on the reflector.

In another embodiment, the reflector comprises a material that is not naturally reflective, such as a plastic or polymer, and the surface of the reflector is coated with a reflective layer 235. The reflective layer 235 also reduces the coefficient of friction of the reflector surface to allow for water and contaminants to wash away as described above. In another variation the reflective layer is further coated with a low-friction coating and/or non-adhesive layer.

In one embodiment, the reflector is a single integrated unit so that the reflector column 232 and the lower portion 234 of the reflector comprise one piece. In an alternative embodiment, the column 232 is fitted onto a separate lower portion 234.

In another embodiment, the reflector is formed of a material that has a releasing agent. The releasing agent can be oil-based, polymer-based or otherwise, and utilized to prevent bugs or mosquitos from adhering to the surface. This is one version, of several, that enables the zapper described herein to be self-cleaning. The others include the angled bottom of the reflector, and other coatings, which when rain water or otherwise enter into the interior of the zapper they easily wash away any bug or mosquito remains without the need of manually pulling out a catching tray, manually brushing the base portion off, or other manual actions. This is important, because these zappers are designed to be mounted onto light poles that can be greater than 10 ft, 15 ft and even upwards of 50 ft, which are not easily accessible for manual cleaning purposes.

In one embodiment, the reflector unit is integrated with a lower portion of the insect zapper as single piece. This has the advantage of providing for a more water tight unit that may have a longer lifespan in areas with high amounts of precipitation or high humidity. In this embodiment, the reflector comprises a nonreflective material that is coated with the reflective coating 235. The reflective coating 235 may coat only the reflector or may be used to coat any exterior surface of the bug zapper that benefits from the coating.

Figure 8A:
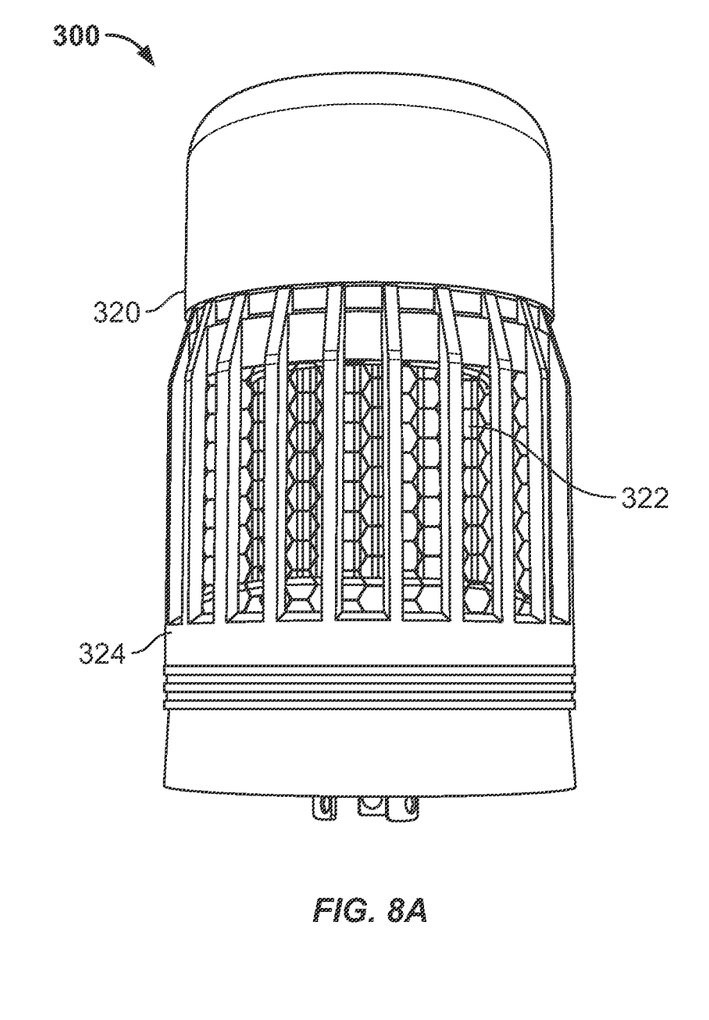
FIGS. 8A-B illustrate other embodiments of insect zappers.
Figure 8B:
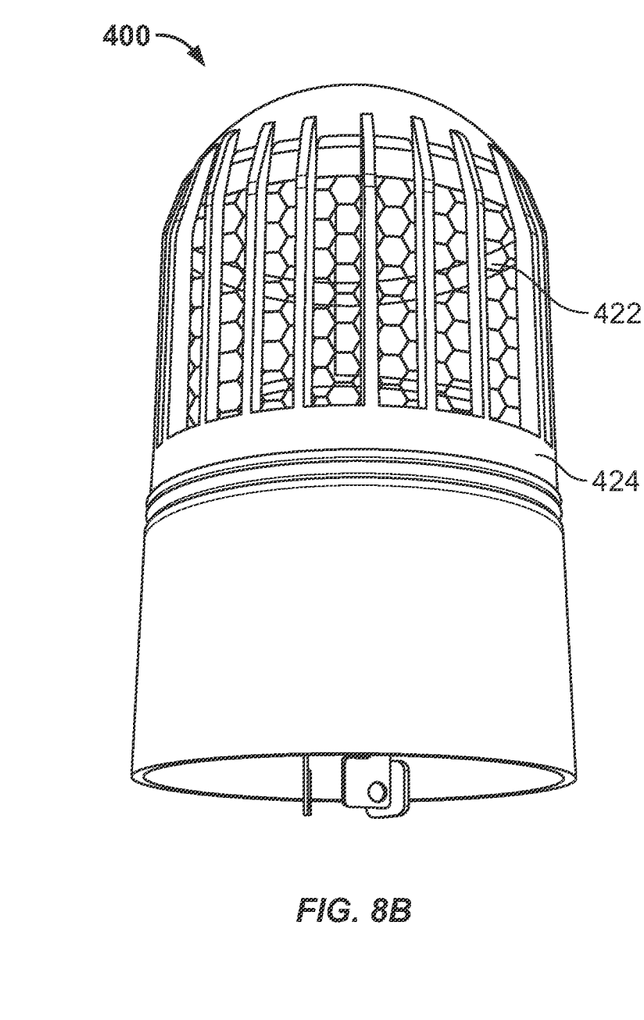

FIGS. 8A-B illustrate alternative embodiments of insect zappers. In FIG. 8A, insect zapper 300 has a photosensor on a top portion above the exterior cage 320 interior cage or contacts 322 and a bottom portion 324 of a light reflector. In FIG. 8B, insect zapper 400 has a photosensor on a bottom portion below the exterior cage 420, interior cage or contacts 422, and a bottom portion 424 of a light reflector. These embodiments differ from the embodiments described above only with regards to an exterior design, and operate in a same manner as described above.

It is desirable for the insect zapper 100, 200 to kill harmful insects, such as biting midges and mosquitos, but to not kill helpful insects such as bees. This is accomplished by configuring the insect zapper 100, 200 to attract the harmful insects and by configuring the exterior of the insect zapper 100, 200 to allow the harmful insects in and not the larger beneficial insects.

The one or more LEDs 124, 224 are configured to emit light of one or more spectrums. Different species and types of insects are attracted to light of different wavelengths. Many conventional insect zappers emit ultraviolet (UV) light that attracts a wide range of insects. However, it has been found that mosquitos and other biting insects are not attracted to UV light. Mosquitos are most attracted to green light and blue light. Blue light has a wavelength of 450-495 nanometers (nm) while green light has a wavelength of 495-570. Accordingly, the one or more LEDs 124, 224 are configured to emit light having a wavelength between 450-570 nm. In one embodiment, at least one LED emits light having a wavelength of 470 nm and at least one LED emits light having a wavelength of 520 nm. By using LEDs that emit light in the wavelength range 450-570 nm, the insect zapper is more likely to attract mosquitos and other biting insects and less likely to attracts insects that are not harmful to humans. In another variation a single LED is configure to emit light two discrete wavelengths, such as 450 and 500.

The outer cage 120, 220 and the inner cage or leads 122, 222 are sized to allow smaller insects to enter the interior of the insect zapper 100, 200 but not larger insects. For example, bumblebees are typically at least twice as large as the size of the largest mosquitos commonly found in the North America. Therefore, the outer cage 220 is size with a space of approximately 10 millimeters between the bars to prevent bumblebees, or other animals larger than mosquitos from entering the insect zapper, but still allow for mosquitos to pass through. The inner cage or leads 122, 222 can have the same spacing as the outer cage 120, 220 to allow small biting insects, such as mosquitos, into a zapping zone. The inner leads 236 are spaced closer together than the outer cage 120, 220 and the inner cage or leads 122, 222 to prevent the insects from flying through the interior of the insect zapper without getting zapped. For example, the inner leads 122, 222 may be spaced less than 10 mm apart.

The benefit of placing the exterior lighting insect zapper 100, 200 into the same plug of for an existing photosensor unit is clear. No extra infrastructure is needed for powering the insect zapper. It is quite simple to plug in and lock exterior lighting insect zapper 100, 200 onto an exterior light (e.g., street light, stadium light). Being on a street light, it is out of reach of the public and not subject to vandalism or other damage. Exterior lighting insect zapper 100, 200 helps to control mosquitos under the lights where the public may frequent, reducing the amount of spraying (if any) that may be necessary. Mosquito adaptation and damage to useful insects will no longer be issues.

Figure 9:
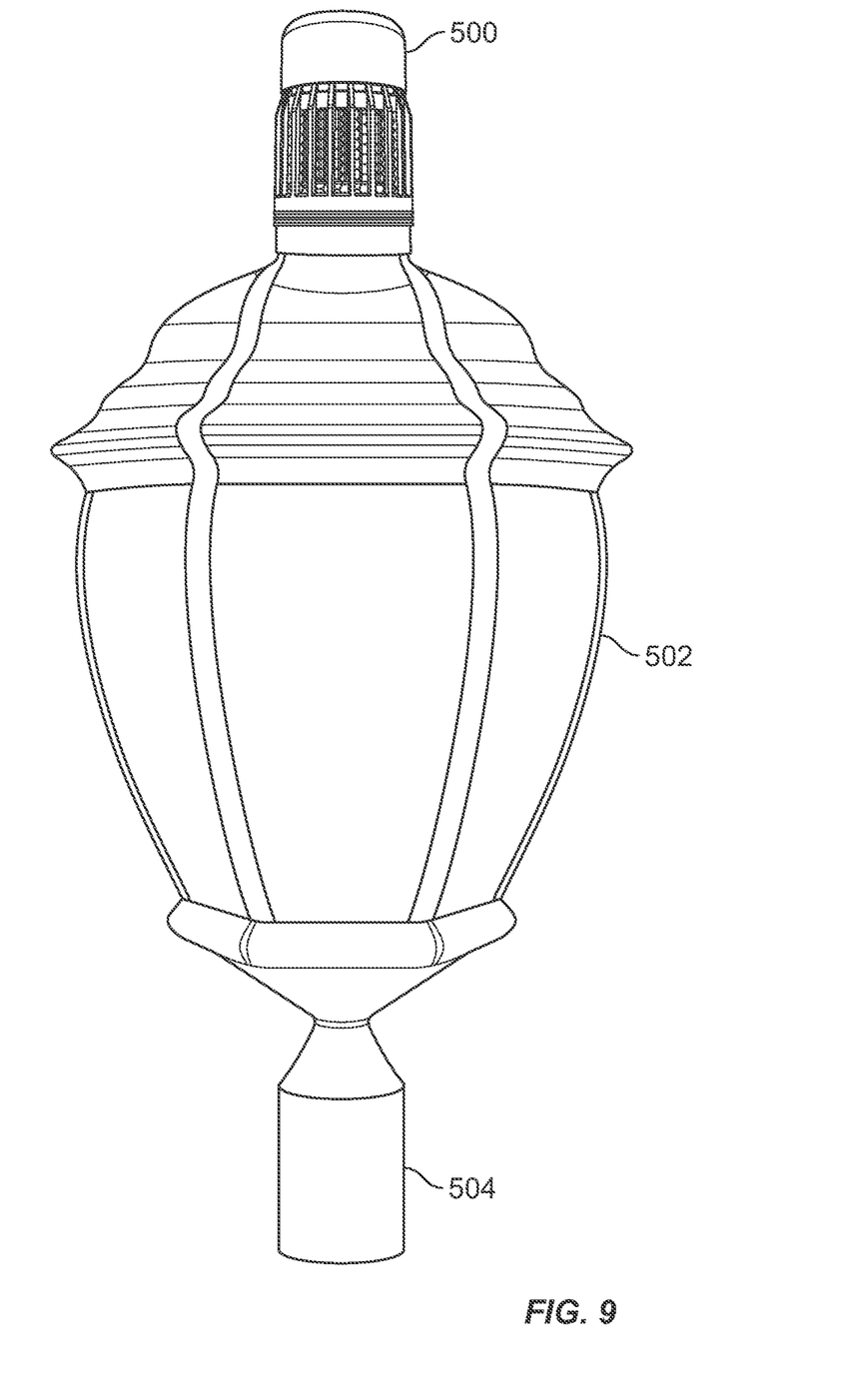
FIG. 9 illustrates an insect zapper mounted on a post lamp style exterior lighting fixture.

Although the insect zapper has been detailed as being used with a certain type of streetlamp as shown in FIG. 1, the insect zapper may be used with any type of outdoor lighting fixture, such as shown in FIG. 9. An insect zapper 500 is mounted above a light fixture 502 which is mounted on a pole 504. The light fixture 502, may also be mounted on a building or other structure.

The insect zapper may also be utilized as a stand-alone insect zapper. In this case a power card is provided in place of the plug 30, 130, 230. Furthermore, the exterior of the insect zapper may include a member configured to be hung from a pole, a cable or other device. The insect zapper can be plugged-in and left "on" outside while the photosensor, water sensor, and temperature sensor are used to control the insect zapper to operate only at times when mosquitos or other biting insects would be outside. Furthermore, the control panel may be used to control operation of the insect zapper to operate during specific time frames or may allow for control of the insect zapper via a smart phone or other device.

Of course, the present invention is not limited to the above features and advantages. Those of ordinary skill in the art will recognize additional features and advantages upon reading the following detailed description, and upon viewing the accompanying drawings.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. An insect zapper system configured to be mounted on an exterior light having a receptacle, the insect zapper system comprising:
   a photosensor assembly configured to sense an amount of light and for turning on or off the exterior light;
   an insect zapper assembly coupled to the photosensor assembly, the insect zapper assembly comprising:
      one or more light-emitting diodes (LEDs) configured to emit light of one or more spectrums;
      an outer cage configured to let insects no larger than a predetermined size to pass through;
      a pair of leads spaced apart by a gap, wherein the leads are configured with a voltage to provide a current arc across the gap when an insect enters the gap, killing the insect;

a temperature sensor, configured to shut off power to at least a portion of the insect zapper assembly when the surrounding temperature is below a predetermined temperature; and a twist-lock plug positioned on a bottom portion of the outer cage that is compatible with the receptacle on the exterior light.

2. The insect zapper assembly of claim 1, wherein the pair of leads are inner and outer metallic tubes, and wherein the inner set of metallic tubes fit within the circumference of the outer set of metallic tubes, creating the gap between the leads.

3. The insect zapper system of claim 1, further comprising:
a first screen along the outer cage, wherein the mesh size of the first screen is a first size; and
a second screen along the inner mesh tube, wherein the mesh size of the second screen is a second size, smaller than the first size.

4. The insect zapper system of claim 1, further comprising:
a light reflector configured to reflect light emitted from the one or more LEDs.

5. The insect zapper system of claim 4, wherein the light reflector comprises a column portion and a bottom portion.

6. The insect zapper system of claim 5, wherein the bottom portion of the light reflector is sloped downward.

7. The insect zapper system of claim 5, further comprising:
a liquid sensor located on the bottom portion of the light reflector and wherein the liquid sensor is configured to turn-off at least a portion of power to the insect zapper assembly when liquid is detected.

8. The insect zapper system of claim 1, wherein the one or more LEDs are configured to emit light having a wavelength in the range of 450-570 nanometers.

9. The insect zapper system of claim 1, wherein the one or more LEDs comprise at least two LEDS, wherein at least one LED is configured to emit light having a wavelength in the range of 450-495 nanometers and at least one LED is configured to emit light having a wavelength in the range of 495-570 nanometers.

10. The insect zapper system of claim 1, wherein the photosensor is configured to turn on or off a portion of power to the insect zapper assembly.

11. The insect zapper system of claim 10, further comprising a control panel, wherein the control panel is configured to enable a user to set one or more operating conditions of the insect zapper.

12. The insect zapper system of claim 11, wherein one of the operating conditions is to operate the insect zapper 24 hours.

13. The insect zapper system of claim 6, wherein the light reflector is comprised of a primary material and reflective coating.

14. The insect zapper system of claim 6, wherein the light reflector is coated with a low-coefficient of friction material configured to allow debris to easily rinse off.

15. An insect zapper assembly comprising:
one or more light-emitting diodes (LEDs) configured to emit light of one or more spectrums, wherein the one or more spectrums of light are configured to be attractive to a desired insect,
an outer cage configured to let insects no larger than a predetermined size to pass through, and
a pair of leads spaced apart by a gap, wherein the leads are configured with a voltage to provide a current arc across the gap when an insect enters the gap, killing the insect;
a photosensor configured to sense an amount of light and for turning on or off power to an exterior light fixture;
a twist-lock plug positioned on a bottom portion of the outer cage that is compatible with a receptacle on the exterior light fixture; and
a reflector disposed on an interior portion of the outer cage, the reflector having a center reflecting column and a reflective flared out and rounded bottom portion, that is configured to allow rain water to wash debris, dust and killed insects off the reflector.

16. The insect zapper system of claim 15, further comprising:
a temperature sensor configured to shut off a portion of power to the insect zapper assembly when an outside temperature is below a predetermined temperature.

17. The insect zapper system of claim 15, further comprising:
a light reflector configured to reflect light emitted from the one or more LEDs, wherein the light reflector comprises a column portion and a sloped bottom portion.

18. The insect zapper system of claim 17, further comprising a liquid sensor positioned along the sloped bottom portion of the light reflector and configured to turn-off at least a portion of power to the insect zapper assembly when liquid is detected.

19. An insect zapper system comprising:
An insect zapper assembly comprising:
one or more light-emitting diodes (LEDs) configured to emit light of one or more spectrums, wherein each of the one or more spectrums of light are configured to be attractive to a desired insect,
an outer cage configured to let insects no larger than a predetermined size to pass through, and
a pair of leads spaced apart by a gap, wherein the leads are configured with a voltage to provide a current arc across the gap when an insect enters the gap, killing the insect;
a reflector disposed on an interior portion of the outer cage, the reflector having a center reflecting column and a reflective flared out and rounded bottom portion, that is configured to allow rain water to wash debris, dust and killed insects off the reflector;
a liquid sensor assembly coupled to the insect zapper assembly near the rounded bottom portion of the reflector, whereupon detecting liquid the liquid sensor assembly is configured to turn a portion of power off to the insect zapper assembly; and
a photosensor assembly configured to sense an amount of light and for turning on or off a portion of power to the insect zapper assembly and power to an exterior light fixture; and
a twist-lock plug positioned on a bottom portion of the outer cage that is compatible with a receptacle on the exterior light fixture.

20. The insect zapper system of claim 19, further comprising a temperature assembly couple to the insect zapper assembly and configured to turn a portion of power off to the insect zapper assembly when an outside temperature is below a predetermined temperature.

21. The insect zapper system of claim 19, further comprising a wireless communication module configured to receive and transmit information to a remote computing device, wherein the received and transmitted information can include any of the following: sensed data information, light sensitivity information, temperature information, power consumption information, and powering on or off portions of the insect zapper system instructions.

\* \* \* \* \*